US012576844B2

(12) United States Patent      (10) Patent No.:   US 12,576,844 B2

Taniguchi et al.      (45) Date of Patent:    Mar. 17, 2026

(54) DRIVING ASSISTANCE METHOD AND DRIVING ASSISTANCE DEVICE

(71) Applicant: Nissan Motor Co., Ltd., Yokohama (JP)

(72) Inventors: Yohei Taniguchi, Kanagawa (JP); Shohei Nakamura, Kanagawa (JP); Yuji Nagasawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 63 days.

(21) Appl. No.: 18/842,007

(22) PCT Filed: Mar. 2, 2022

(86) PCT No.: PCT/JP2022/008930

§ 371 (c)(1),
(2) Date: Aug. 27, 2024

(87) PCT Pub. No.: WO2023/166623

PCT Pub. Date: Sep. 7, 2023

(65) Prior Publication Data

US 2025/0171022 A1     May 29, 2025

(51) Int. Cl.
    *B60W 30/16*       (2020.01)
    *G08G 1/16*       (2006.01)

(52) U.S. Cl.
    CPC ............ *B60W 30/16* (2013.01); *G08G 1/166* (2013.01); *B60W 2554/4041* (2020.02); *B60W 2720/10* (2013.01); *B60W 2754/30* (2020.02)

(58) Field of Classification Search
    CPC ........... B60W 30/16; B60W 30/18163; B60W 50/14; G08G 1/167
    See application file for complete search history.

(56) References Cited

U.S. PATENT DOCUMENTS

| | | |
|---|---|---|
| 9,682,708 B2 | 6/2017 | Maruyama |
| 11,613,257 B2 | 3/2023 | Nishimura et al. |
| 11,945,442 B2 | 4/2024 | Nishimura et al. |
| 2016/0091896 A1 | 3/2016 | Maruyama |

(Continued)

FOREIGN PATENT DOCUMENTS

| | | |
|---|---|---|
| JP | 2016-071513 A | 5/2016 |
| JP | 2020-052658 A | 4/2020 |
| JP | 2021-062696 A | 4/2021 |

*Primary Examiner* — Anshul Sood

(74) *Attorney, Agent, or Firm* — Young Basile Hanlon & MacFarlane, P.C.

(57) ABSTRACT

A driving assistance method causes a controller to perform processing of making a proposal of a lane change to a passenger when an index value based on relative speed of a preceding vehicle with respect to an own vehicle is less than a threshold value and canceling the proposal of the lane change when a lane change execution condition is not satisfied. The controller performs processing including: accepting setting of the threshold value; and not presenting a lane change proposal after the proposal of the lane change is canceled depending on the travel environment until a set time elapses from a time point when the proposal of the lane change is canceled, even when the index value is less than the threshold value, and the set time is set to a longer time when the threshold value is high than when the threshold value is low.

5 Claims, 4 Drawing Sheets

(56)  References Cited

U.S. PATENT DOCUMENTS

| | | | |
|---|---|---|---|
| 2020/0094838 A1 | 3/2020 | Nishimura et al. | |
| 2021/0107510 A1 | 4/2021 | Kato et al. | |
| 2022/0204054 A1* | 6/2022 | Taniguchi | G08G 1/167 |
| 2023/0109842 A1 | 4/2023 | Nishimura et al. | |
| 2023/0150540 A1* | 5/2023 | Kim | B60W 30/0953 |
| | | | 701/25 |
| 2023/0159051 A1 | 5/2023 | Kato et al. | |

* cited by examiner

DRIVING ASSISTANCE METHOD AND DRIVING ASSISTANCE DEVICE

TECHNICAL FIELD

The present invention relates to a driving assistance method and a driving assistance device.

BACKGROUND

JP 2020-52658 A described below describes that in an autonomous driving system configured to propose an own vehicle passing a preceding vehicle during autonomous driving to a driver, first prohibition time during which after proposing passing a preceding vehicle, proposing passing a preceding vehicle again is not permitted is set.

SUMMARY

There are some cases where after a controller presents a proposal of a lane change (hereinafter, sometimes referred to as "lane change proposal") to a passenger, based on relative speed of a preceding vehicle with respect to the own vehicle, the lane change proposal is canceled by the controller. When a period during which after a lane change proposal is canceled, another lane change proposal is not presented lasts long, there are some cases where a condition for proposing a lane change becomes less likely to be established due to change in a travel environment during the period and an opportunity for a lane change is missed. On the other hand, whether or not to prefer lane change by the own vehicle varies between individuals.

An object of the present invention is to increase opportunities of lane change based on relative speed of a preceding vehicle with respect to an own vehicle for a passenger who prefers lane change more than for a passenger who does not prefer lane change very much.

According to an aspect of the present invention, there is provided a driving assistance method for causing a controller to perform processing of making a proposal of a lane change to a passenger when an index value based on relative speed of a preceding vehicle with respect to an own vehicle is less than a threshold value and canceling the proposal of the lane change when a lane change execution condition depending on a travel environment of the own vehicle is not satisfied, wherein the controller performs processing including: accepting setting of the threshold value; and not presenting a lane change proposal after the proposal of the lane change is canceled depending on the travel environment until a set time elapses from a time point when the proposal of the lane change is canceled, even when the index value is less than the threshold value, and the set time is set to a longer time when the threshold value is high than when the threshold value is low.

According to an aspect of the present invention, it is possible to increase opportunities of lane change based on relative speed of a preceding vehicle with respect to an own vehicle for a passenger who prefers lane change more than for a passenger who does not prefer lane change very much.

The object and advantages of the invention will be realized and attained by means of the elements and combinations particularly pointed out in the claims. It is to be understood that both the foregoing general description and the following detailed description are exemplary and explanatory and are not restrictive of the invention.

DETAILED DESCRIPTION (Configuration)

Figure 1:
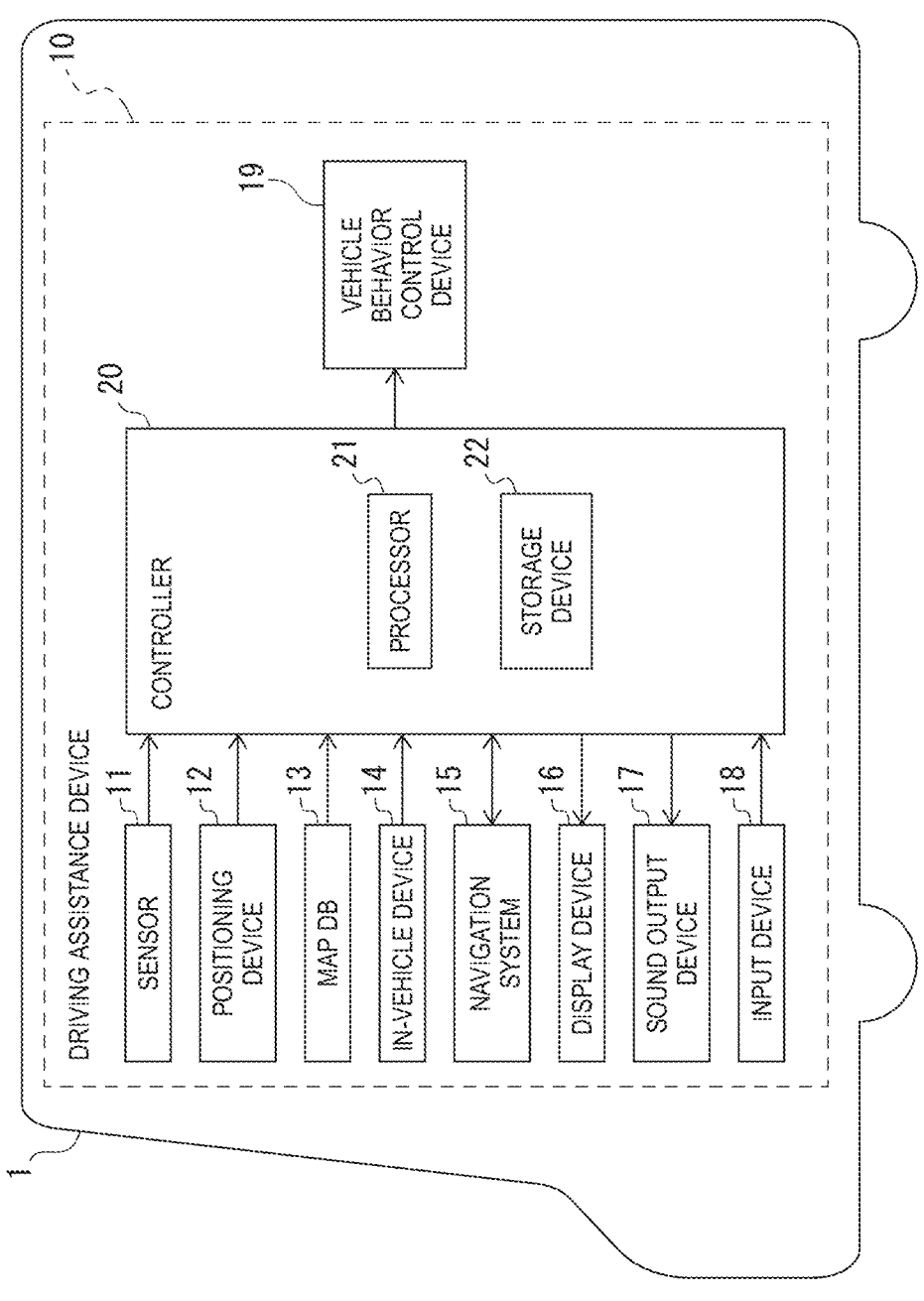
FIG. 1 is a diagram illustrative of an example of a schematic configuration of a vehicle on which a driving assistance device of an embodiment is mounted.

FIG. 1 is a diagram illustrative of an example of a schematic configuration of a vehicle on which a driving assistance device of an embodiment is mounted. A driving assistance device 10 mounted on an own vehicle 1 includes sensors 11, a positioning device 12, a map database (map DB) 13, in-vehicle devices 14, a navigation system 15, display devices 16, sound output devices 17, input devices 18, a vehicle behavior control device 19, and a controller 20. The above-described devices are connected to one another via, for example, a controller area network (CAN) or another in-vehicle LAN in order to perform transmission and reception of information with one another.

The sensors 11 detect a travel state of the own vehicle 1. For example, the sensors 11 include cameras, such as a front view camera to capture a front view of the own vehicle 1, a rear view camera to capture a rear view of the own vehicle 1, and side view cameras to capture right and left side views of the own vehicle 1. In addition, the sensors 11 include radars, such as a front view radar to detect an obstacle in front of the own vehicle 1, a rear view radar to detect an obstacle in the rear of the own vehicle 1, and side view radars to detect an obstacle existing on the right and left lateral sides of the own vehicle 1. Further, the sensors 11 include a vehicle speed sensor or the like to detect vehicle speed of the own vehicle 1.

The positioning device 12 includes a GPS unit, a gyro sensor, a vehicle speed sensor, and the like. The positioning device 12 detects radio waves transmitted from a plurality of communication satellites by the GPS unit and periodically acquires position information of the own vehicle 1. In addition, the positioning device 12 detects a current position of the own vehicle 1, based on acquired position information of the own vehicle 1, angle change information acquired from the gyro sensor, and vehicle speed acquired from the vehicle speed sensor.

The map database 13 is a memory that stores three-dimensional high-definition map information including position information of various types of facilities and specific points and that is configured to be accessible from the controller 20. The three-dimensional high-definition map information is map information in which detailed and highly precise position information of a curved road and the amount of curvature (for example, curvature or radius of curvature) thereof, a junction of roads, a branch point, a tollgate, a point of reduction in the number of lanes, and the like is associated with the map information as three-dimensional information. In addition, the three-dimensional high-definition map information includes, as information in units of lanes (that is, lane information), information about lane nodes that indicate reference points on a lane reference line (for example, a center line in a lane) and information about lane links that indicate forms of lane sections between lane nodes.

The in-vehicle devices 14 are various types of devices mounted on the own vehicle 1 and operate in accordance with operation performed by a passenger (for example, a driver). Examples of such in-vehicle devices include a steering wheel, an accelerator pedal, a brake pedal, turn signals, windshield wipers, lights, a horn, other specific switches, and the like.

The navigation system 15 or navigation method acquires current position information of the own vehicle 1 from the positioning device 12 and, by superimposing the position of the own vehicle 1 on map information for navigation, displays the current position on a display or the like. In addition, the navigation system 15 performs navigation control to, when a destination is set, set a route from the current position of the own vehicle 1 to the destination as a target travel route and guide the passenger along the target travel route. In the navigation control, the navigation system 15 displays the target travel route on a map on the display and informs the passenger of the target travel route by voice or the like. The target travel route set by the navigation system 15 is also used in route travel assistance control performed by the controller 20. The route travel assistance control is control to cause the own vehicle 1 to autonomously travel to the destination along the set target travel route.

The display devices 16 include a various types of displays, such as a display that the navigation system 15 includes, a display incorporated in a rearview mirror, a display incorporated in a meter section, and a head-up display projected on a windshield. The display devices 16 notify the passenger of various types of presented information in accordance with control performed by the controller 20.

The sound output devices 17 are devices to output acoustic information, such as a speaker that the navigation system 15 includes, a speaker of an audio device, and a buzzer. The sound output devices 17 notify the passenger of various types of presented information in accordance with control performed by the controller 20.

The input devices 18 are devices, such as a button switch that enables the passenger to input an operation by manual operation, a touch panel arranged on a display screen, and a microphone that enables the passenger to input an operation by voice. The passenger can input setting information in response to the presented information presented by a display device 16 or a sound output device 17 by operating an input device 18.

Figure 2:
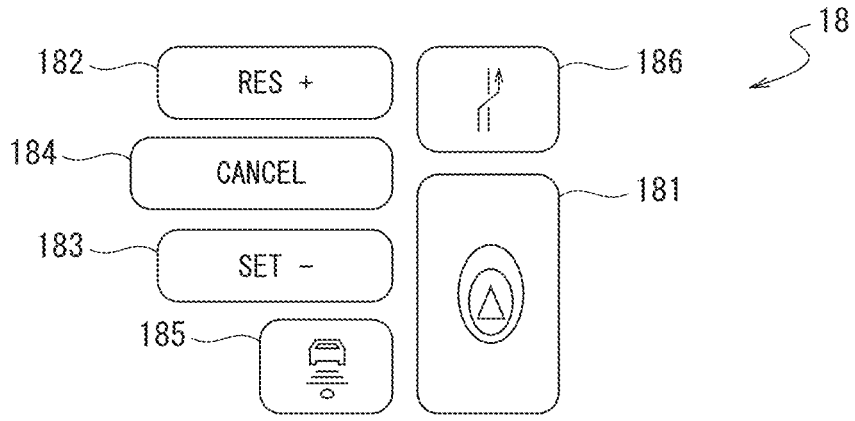
FIG. 2 is a diagram illustrative of some of input devices in FIG. 1.

FIG. 2 is a diagram illustrative of some of the input devices 18 of the present embodiment. The input devices 18 may be a button switch group that is arranged on, for example, a spoke of the steering wheel. The input devices 18 are used when turning-on and -off and the like of autonomous travel control performed by the controller 20 are set. The input devices 18 include a main switch 181, a resume/accelerate switch 182, a set/coast switch 183, a cancel switch 184, an inter-vehicle distance adjustment switch 185, and a lane change assistance switch 186.

The main switch 181 is a switch to turn on and off the autonomous travel control performed by the controller 20.

The resume/accelerate switch 182 is a switch to, after the autonomous travel control is turned off, set resumption of the autonomous travel control at a set speed before the turning-off of the autonomous travel control or to increase the set speed. The set/coast switch 183 is a switch to start the autonomous travel control. In order to start the autonomous travel control, after the autonomous travel control is turned on by the main switch 181, the set/coast switch 183 is pressed. The set/coast switch 183 is also a switch to reduce the set speed. The cancel switch 184 is a switch to cancel the autonomous travel control. The inter-vehicle distance adjustment switch 185 is a switch to set an inter-vehicle distance to a preceding vehicle. The lane change assistance switch 186 is a switch to, when the controller 20 confirms start of a lane change to the passenger, instruct (approve) the start of the lane change.

Note that, in addition to the button switch group illustrated in FIG. 2, a turn signal lever to turn on a turn signal and switches of other in-vehicle devices 14 can be used as the input devices 18.

The vehicle behavior control device 19 controls vehicle behavior of the own vehicle 1. For example, when the own vehicle 1 performs constant speed travel at a set speed by the autonomous travel control, the vehicle behavior control device 19 controls operation of a drive mechanism and brake operation to achieve acceleration/deceleration and travel speed that enable the own vehicle 1 to travel at the set speed. In addition, when the own vehicle 1 travels following a preceding vehicle by the autonomous travel control, the vehicle behavior control device 19 also likewise controls the operation of the drive mechanism and the brake. Note that the operation control of the drive mechanism includes operation of an internal-combustion engine in the case of an engine-driven vehicle and operation of a motor for traveling in the case of an electric vehicle. In addition, the operation control of the drive mechanism includes torque distribution between an internal-combustion engine and a motor for traveling in the case of a hybrid vehicle.

In addition, when the vehicle behavior control device 19 performs lane-keeping control, lane change assistance control, passing assistance control, or route travel assistance control, which will be described later, by the autonomous travel control, the vehicle behavior control device 19 performs steering control of the own vehicle 1 by controlling operation of a steering actuator in addition to the operation control of the drive mechanism and the brake.

The controller 20 is one or a plurality of electronic control units (ECUs) for controlling travel of the own vehicle 1 and includes a processor 21 and peripheral components, such as a storage device 22. The processor 21 may be, for example, a CPU or an MPU. The storage device 22 may include a semiconductor storage device, a magnetic storage device, an optical storage device, or the like. The storage device 22 may include registers, a cache memory, and a memory, such as a ROM and a RAM, that is used as a main storage device.

Functions of the controller 20, which will be described below, are achieved by, for example, the processor 21 executing computer programs stored in the storage device 22.

The controller 20 achieves a travel information acquisition function to acquire information relating to a travel state of the own vehicle 1 and also performs autonomous travel control to autonomously control travel speed and/or steering of the own vehicle 1. The travel information acquisition function is a function to acquire travel information relating to a travel state of the own vehicle 1. For example, the controller 20 may acquire, as the travel information, image information of the outside of the vehicle captured by the front view camera, the rear view camera, and the side view cameras in the sensors 11. In addition, the controller 20 acquires, as the travel information, detection results by the front view radar, the rear view radar, and the side view radars. Further, the controller 20 also acquires, as the travel information, vehicle speed information of the own vehicle 1 detected by the vehicle speed sensor in the sensors 11.

Further, the controller 20 acquires, as the travel information, the current position information of the own vehicle 1 from the positioning device 12. The controller 20 acquires, as the travel information, a set destination and a target travel route to the destination from the navigation system 15. The controller 20 acquires, as the travel information, map information, such as position information of a curved road and the amount of curvature (for example, curvature or radius of curvature) thereof, a junction of roads, a branch point, a tollgate, a point of reduction in the number of lanes, and the like and lane information, from the map database 13. The controller 20 acquires, as the travel information, information about operation of the in-vehicle devices 14 performed by the passenger from the in-vehicle devices 14.

In the autonomous travel control, the controller 20 autonomously controls travel of the own vehicle 1 without depending on operation performed by the passenger. The autonomous travel control performed by the controller 20 includes autonomous speed control to autonomously control travel speed of the own vehicle 1 and autonomous steering control to autonomously control steering of the own vehicle 1.

<Autonomous Speed Control>

In the autonomous speed control, when the controller 20 is detecting a preceding vehicle, the controller 20 controls the own vehicle 1 to travel following the preceding vehicle while performing inter-vehicle distance control in such a way as to keep inter-vehicle distance depending on vehicle speed, with a vehicle speed set by the passenger or a speed limit as an upper limit. In contrast, when the controller 20 is not detecting a preceding vehicle, the controller 20 controls the own vehicle 1 to perform constant speed travel at the vehicle speed set by the passenger or the speed limit. The former and the latter are also referred to as inter-vehicle distance control and constant speed control, respectively. The passenger may set the inter-vehicle distance in the inter-vehicle distance control by operating the inter-vehicle distance adjustment switch 185.

The constant speed control is performed when it is detected by a front view radar or the like in the sensors 11 that no preceding vehicle exists ahead of the own vehicle 1 in a lane in which the own vehicle 1 is traveling. In the constant speed control, the controller 20 controls operation of the drive mechanism, such as the engine and the brake, by the vehicle behavior control device 19 while feeding back vehicle speed data detected by the vehicle speed sensor in such a manner that the own vehicle 1 maintains a set travel speed.

The inter-vehicle distance control is performed when it is detected by the front view radar or the like in the sensors 11 that a preceding vehicle exists ahead of the own vehicle 1 in the lane in which the own vehicle 1 is traveling. In the inter-vehicle distance control, the controller 20 controls operation of the drive mechanism, such as the engine and the brake, by the vehicle behavior control device 19 while feeding back inter-vehicle distance data detected by the front view radar in such a manner that the own vehicle 1 maintains a set inter-vehicle distance with the set travel speed as an upper limit.

<Autonomous Steering Control>

In the autonomous steering control, the controller 20 performs the steering control of the own vehicle 1 by controlling operation of the steering actuator, based on the travel information acquired by the travel information acquisition function. The autonomous steering control includes the lane-keeping control, the lane change assistance control, the passing assistance control, and the route travel assistance control.

In the lane-keeping control, the controller 20 assists steering wheel operation performed by the passenger by controlling the steering actuator in such a way that, for example, the own vehicle 1 travels substantially along the center of a lane.

In the lane change assistance control, when the passenger operates the turn signal lever, the controller 20 turns on a turn signal and determines whether or not a predetermined lane change start condition is established, based on various types of travel information acquired by the travel information acquisition function. The controller 20 starts the lane change operation when the lane change start condition is satisfied.

In the lane change operation, the controller 20 performs lane change manipulation to cause the own vehicle 1 to laterally move to an adjacent lane that is a lane change destination (hereinafter, sometimes referred to as "destination lane"). While the controller 20 is performing the lane change operation, the controller 20 presents information indicating that the own vehicle 1 is automatically making a lane change, to the passenger by a display device 16. When the lane change manipulation is finished, the controller 20 turns off the turn signal and starts performance of a lane-keeping function in the lane after lane change.

Hereinafter, a function of the controller 20 to perform the lane change assistance control is sometimes referred to as "lane change assistance function".

Note that the lane change start condition may include, for example, the following conditions.

The lane change assistance function is effective.

Distance d between another vehicle in the destination lane and the own vehicle 1 is greater than or equal to a distance threshold value Dp. For example, the distance d may be inter-vehicle distance or inter-vehicle time between the another vehicle and the own vehicle 1 in the lane extension direction.

Lane change to the destination lane side can be made (for example, a lane marking does not prohibit lane change, radius of curvature of the road is greater than or equal to 250 m, and the like).

When a period during which the lane change start condition is not satisfied continues for a predetermined period or more even after a turn signal was turned on by operation of the turn signal lever performed by the passenger and the predetermined time has elapsed, the controller 20 turns off the turn signal and cancels the automated lane change.

In the passing assistance control, when a preceding vehicle exists ahead of the own vehicle 1 in the lane in which the own vehicle 1 is traveling and a predetermined passing proposal condition is satisfied, the controller 20 proposes making a lane change by the autonomous travel control and passing the preceding vehicle, to the passenger. Hereinafter, a proposal to make a lane change to pass a preceding vehicle is sometimes referred to as "passing proposal".

In the passing proposal condition, a condition requiring that an index value IV based on relative speed Vr (Vr=vehicle speed Vp of the preceding vehicle−vehicle speed Vh of the own vehicle) of the preceding vehicle with respect to the own vehicle 1 is less than a predetermined threshold value is included. The index value IV is set to be larger when the relative speed Vr is high than when the relative speed Vr is low. For example, the index value IV may be set in such a manner that the higher the relative speed Vr is, the larger the index value IV becomes. For example, the index value IV may be, for example, the relative speed Vr itself. That is, the passing proposal condition may include a condition requiring that the relative speed Vr is less than a predetermined threshold speed Vt.

In addition, for example, the index value IV may be an inter-vehicle time Di between the own vehicle 1 and the preceding vehicle. That is, the passing proposal condition may include a condition requiring that the inter-vehicle time Di is less than a predetermined threshold value.

In the following description, a case where the index value IV is the relative speed Vr itself will be described.

The threshold speed Vt is set to a speed higher than 0 in advance by the passenger manually operating an input device 18 or an in-vehicle device 14. For example, the passenger may select one of speeds V1, V2, and V3 (V1<V2<V3) according to preference and set the selected speed as the threshold speed Vt. For example, V1, V2, and V3 may be 5, 10, and 15 km/h, respectively. The passenger may set a threshold speed Vt of an arbitrary value.

For example, when a driving mode that represents driving characteristics of the own vehicle 1 can be changed by the passenger, the controller 20 may set the threshold speed Vt according to a current driving mode. The passenger may select a driving mode by manually operating an input device 18 or an in-vehicle device 14. For example, the controller 20 may set the threshold speed Vt to V1 when the driving mode is a sport mode, set the threshold speed Vt to V2 when the driving mode is a normal mode, and set the threshold speed Vt to V3 when the driving mode is a comfort mode. In addition, for example, the controller 20 may set the threshold speed Vt according to the inter-vehicle distance in the inter-vehicle distance control of the above-described autonomous speed control. For example, the controller 20 may set the threshold speed Vt higher when the inter-vehicle distance is long than when the inter-vehicle distance is short.

The lower the threshold speed Vt is, the easier the passing proposal condition becomes to be satisfied even when a speed difference between the own vehicle 1 and the preceding vehicle is small. Therefore, a passenger who prefers the own vehicle 1 passing a preceding vehicle tends to set a lower threshold speed Vt than a passenger who does not prefer the own vehicle 1 passing a preceding vehicle very much.

In addition, for example, the controller 20 may set the threshold speed Vt and the inter-vehicle distance in the inter-vehicle distance control in an interlocking manner according to the current driving mode. For example, the controller 20 may set the threshold speed Vt to V1 and also set the inter-vehicle distance to D1 when the driving mode is the sport mode, set the threshold speed Vt to V2 and also set the inter-vehicle distance to D2 when the driving mode is the normal mode, and set the threshold speed Vt to V3 and also set the inter-vehicle distance to D3 when the driving mode is the comfort mode (D1<D2<D3).

When the passenger approves the passing proposal by operating the lane change assistance switch 186 in the input devices 18 in response to the presentation of the passing proposal and a predetermined passing execution condition is satisfied, the controller 20 performs the automated lane change. In the automated lane change, the controller 20 performs the lane change operation in such a way that the own vehicle 1 moves to the destination lane.

Further, when after the own vehicle 1 has passed the preceding vehicle, a predetermined lane return proposal condition is satisfied, the controller 20 proposes making a lane change by the autonomous travel control and returning to an original lane before the passing of the preceding vehicle, to the passenger by a display device 16. Hereinafter, a proposal of a lane change to return to the original lane after passing a preceding vehicle is sometimes referred to as "lane return proposal". When the passenger approves the lane return proposal by operating the lane change assistance switch 186 in the input devices 18 in response to the presentation of the lane return proposal and a predetermined lane return execution condition is satisfied, the controller 20 performs the automated lane change. In the automated lane change, the controller 20 performs the lane change operation in such a way that the own vehicle 1 moves to the original lane. Hereinafter, a function of the controller 20 to perform the passing assistance control is sometimes referred to as "passing assistance function".

In the route travel assistance control, when a predetermined route travel execution condition is satisfied before the own vehicle 1 reaches a travel direction change point, such as a branch point, a junction, an exit, and a tollgate, that exists on the target travel route set by the navigation system 15, the controller 20 proposes making a lane change by the autonomous travel control to cause the vehicle to travel along the target travel route (that is, a lane change in accordance with navigation guiding the target travel route), to the passenger. Hereinafter, a proposal to make a lane change to cause the vehicle to travel along the target travel route is sometimes referred to as "route travel proposal". When the passenger approves the route travel proposal by operating the lane change assistance switch 186 in the input devices 18 in response to the presentation of the route travel proposal and the predetermined route travel execution condition is satisfied, the controller 20 performs the automated lane change. In the automated lane change, the controller 20 performs the lane change operation in such a way that the own vehicle 1 moves to the destination lane.

Figure 3:
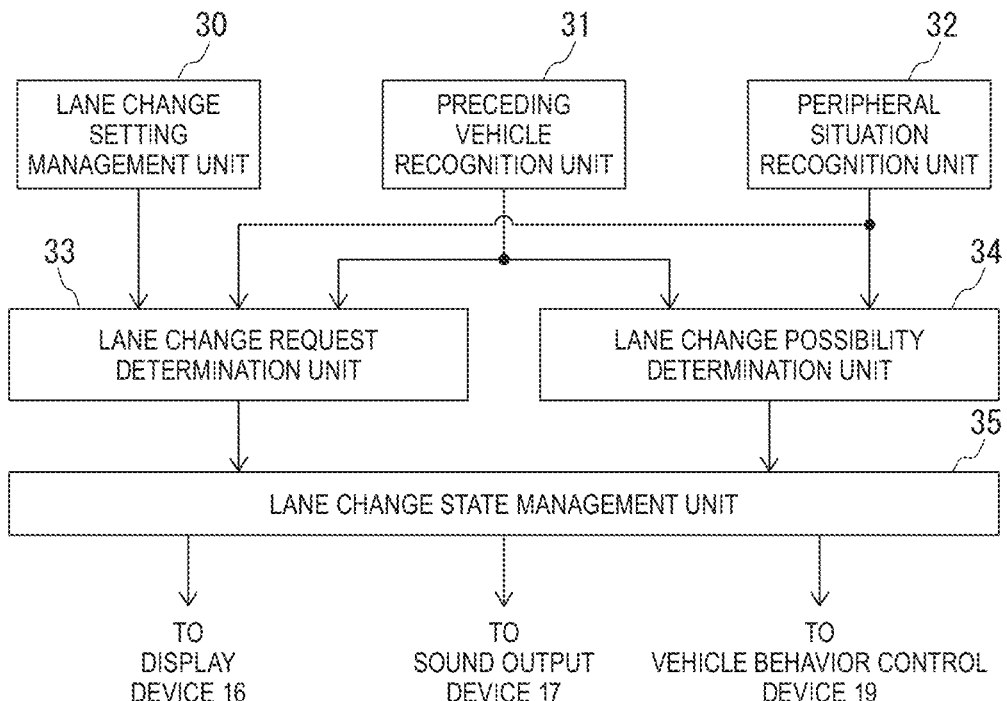
FIG. 3 is a block diagram of an example of a functional configuration for performing passing assistance control in a controller.

FIG. 3 is a block diagram of an example of a functional configuration for performing the passing assistance control in the controller 20. The controller 20 includes a lane change setting management unit 30, a preceding vehicle recognition unit 31, a peripheral situation recognition unit 32, a lane change request determination unit 33, a lane change possibility determination unit 34, and a lane change state management unit 35.

The lane change setting management unit 30 sets the threshold speed Vt in response to a manual operation of an input device 18 or an in-vehicle device 14 performed by the passenger. That is, the lane change setting management unit 30 directly or indirectly accepts input from the passenger setting the threshold speed Vt.

In addition, the lane change setting management unit 30 sets a waiting time threshold value Tt according to the setting of the threshold speed Vt.

The waiting time threshold value Tt is a time for which when after a passing proposal or a lane return proposal is presented, the controller 20 cancels the passing proposal or the lane return proposal since the passing execution condition or the lane return execution condition is not satisfied, re-presenting the passing proposal or the lane return proposal is suspended (prohibited) from a time point when the controller 20 cancels the passing proposal or the lane return proposal. Note that cancellation of the passing proposal or the lane return proposal by the controller 20 includes cancellation of the passing proposal itself or the lane return proposal itself as well as cancellation of presentation of the passing proposal or the lane return proposal. For example, the cancellation of the passing proposal or the lane return proposal includes cancellation of the passing proposal itself or the lane return proposal itself when even after presentation of the passing proposal or the lane return proposal is finished, the proposal itself continues to be effective, such as when the proposal is presented by a sound output device 17 and when the proposal is temporarily displayed by a display device 16. The waiting time threshold value Tt is an example of "set time" described in the claims.

The lane change setting management unit 30 sets a longer waiting time threshold value Tt when the threshold speed Vt is high than when the threshold speed Vt is low. For example, the lane change setting management unit 30 sets a waiting time threshold value Tt in such a manner that the higher the threshold speed Vt is, the longer the waiting time threshold value Tt is. For example, when the threshold speed Vt is V1, V2, and V3, the lane change setting management unit 30 may set the waiting time threshold value Tt to T1, T2, and T3 (T1<T2<T3), respectively. For example, T1, T2, and T3 may be 5, 15, and 30 seconds, respectively.

The preceding vehicle recognition unit 31 recognizes a preceding vehicle existing ahead of the own vehicle 1 in the lane in which the own vehicle 1 is traveling, based on the travel information and detects relative speed Vr of the preceding vehicle with respect to the own vehicle 1.

The peripheral situation recognition unit 32 recognizes a situation in the surroundings of the own vehicle 1 (for example, other vehicles and white lines), based on the travel information. In particular, the peripheral situation recognition unit 32 recognizes distance d in a lane extension direction between another vehicle in a destination lane and the own vehicle 1.

When the preceding vehicle recognition unit 31 recognizes a preceding vehicle, the lane change request determination unit 33 determines whether or not the predetermined passing proposal condition is satisfied. For example, the passing proposal condition may include the following conditions.

The passing assistance function is effective.

The relative speed Vr of the preceding vehicle with respect to the own vehicle 1 is less than the threshold speed Vt (when the inter-vehicle time Di is used as the index value IV based on the relative speed Vr, a condition requiring that the inter-vehicle time Di is less than a threshold value may be used).

The distance d between another vehicle in the destination lane and the own vehicle 1 is greater than or equal to the distance threshold value Dp.

Lane change to the destination lane side can be made.

When the passing proposal condition is satisfied, the lane change request determination unit 33 outputs a passing proposal request to the lane change state management unit 35. Note, however, that the lane change request determination unit 33 measures elapsed time Tc since the lane change state management unit 35 canceled a passing proposal last time and, when the elapsed time Tc is less than the waiting time threshold value Tt, suspends (prohibits) output of a passing proposal request to the lane change state management unit 35. That is, when the elapsed time Tc is greater than or equal to the waiting time threshold value Tt, the lane change request determination unit 33 permits output of another passing proposal request (outputs an output of a passing proposal request).

When the passing assisted by the passing assistance control is finished, the lane change request determination unit 33 determines whether or not the predetermined lane return proposal condition is satisfied. For example, the lane return proposal condition may include the following conditions.

The passing assistance function is effective.

The distance d between another vehicle in the destination lane and the own vehicle 1 is greater than or equal to the distance threshold value Dp.

Lane change to the original lane side before the passing of the preceding vehicle can be made.

When the lane return proposal condition is satisfied, the lane change request determination unit 33 outputs a lane return proposal request to the lane change state management unit 35. Note, however, that the lane change request determination unit 33 measures elapsed time Tc since the lane change state management unit 35 canceled a lane return proposal last time and, when the elapsed time Tc is less than the waiting time threshold value Tt, suspends (prohibits) output of a lane return proposal request to the lane change state management unit 35.

When the lane change request determination unit 33 outputs a passing proposal request, the lane change state management unit 35 outputs passing information for presenting a passing proposal to the passenger, by a display device 16 or a sound output device 17. When the lane change request determination unit 33 outputs a lane return proposal request, the lane change state management unit 35 outputs lane return information for presenting a lane return proposal to the passenger, by a display device 16 or a sound output device 17.

When in response to the presentation of a passing proposal, the passenger approves the passing proposal by operating the lane change assistance switch 186 in the input devices 18, the lane change state management unit 35 turns on a turn signal. For example, the lane change state management unit 35 may turn on a turn signal immediately after the lane change assistance switch 186 is operated. When the passing proposal is presented to the passenger, the lane change possibility determination unit 34 determines whether or not the predetermined passing execution condition is established. The lane change state management unit 35 may turn on a turn signal before the lane change possibility determination unit 34 determines whether or not the passing execution condition is established.

For example, the passing execution condition may include the following conditions.

The passing assistance function is effective.

The relative speed Vr of the preceding vehicle with respect to the own vehicle 1 is less than the threshold speed Vt (when the inter-vehicle time Di is used as the index value IV based on the relative speed Vr, a condition requiring that the inter-vehicle time Di is less than a threshold value may be used).

The distance d in the lane extension direction between another vehicle in the destination lane and the own vehicle 1 is greater than or equal to the distance threshold value Dp.

Lane change to the destination lane side can be made.

When the passenger approves the passing proposal and the passing execution condition is satisfied, the lane change state management unit 35 performs the automated lane change. In the automated lane change, the lane change state management unit 35 starts the lane change operation in such a way that the own vehicle 1 moves to the destination lane. When the passing execution condition is not satisfied even after a predetermined length of time has elapsed since the passing proposal was approved or a turn signal was turned on, the lane change state management unit 35 turns off the turn signal and cancels the automated lane change. That is, the lane change state management unit 35 cancels the passing proposal. On this occasion, the lane change request determination unit 33 resets a value of the elapsed time Tc to 0 and starts measurement of the elapsed time Tc since the lane change state management unit 35 canceled the passing proposal.

When in response to the presentation of a lane return proposal, the passenger approves the lane return proposal by operating the lane change assistance switch 186 in the input devices 18, the lane change state management unit 35 turns on a turn signal. For example, the lane change state management unit 35 may turn on a turn signal immediately after the lane change assistance switch 186 is operated. When the lane return proposal is presented to the passenger, the lane change possibility determination unit 34 determines whether or not the predetermined lane return execution condition is established. The lane change state management unit 35 may turn on a turn signal before the lane change possibility determination unit 34 determines whether or not the lane return execution condition is established. For example, the lane return execution condition may include the following conditions.

The passing assistance function is effective.

The distance d in the lane extension direction between another vehicle in the destination lane and the own vehicle 1 is greater than or equal to the distance threshold value Dp.

Lane change to the original lane side before the passing of the preceding vehicle can be made.

When the passenger approves the lane return proposal and the lane return execution condition is satisfied, the lane change state management unit 35 performs the automated lane change. In the automated lane change, the lane change state management unit 35 starts the lane change operation in such a way that the own vehicle 1 moves to the original lane. When the lane return execution condition is not satisfied even after a predetermined length of time has elapsed since the lane return proposal was approved or a turn signal was turned on, the lane change state management unit 35 turns off the turn signal and cancels the automated lane change. That is, the lane change state management unit 35 cancels the lane return proposal. On this occasion, the lane change request determination unit 33 resets the value of the elapsed time Tc to 0 and starts measurement of the elapsed time Tc since the lane change state management unit 35 canceled the lane return proposal.

The vehicle behavior control device 19 performs steering control of the own vehicle 1 by controlling operation of the steering actuator, based on a command from the lane change state management unit 35.

(Operation)

Figure 4:
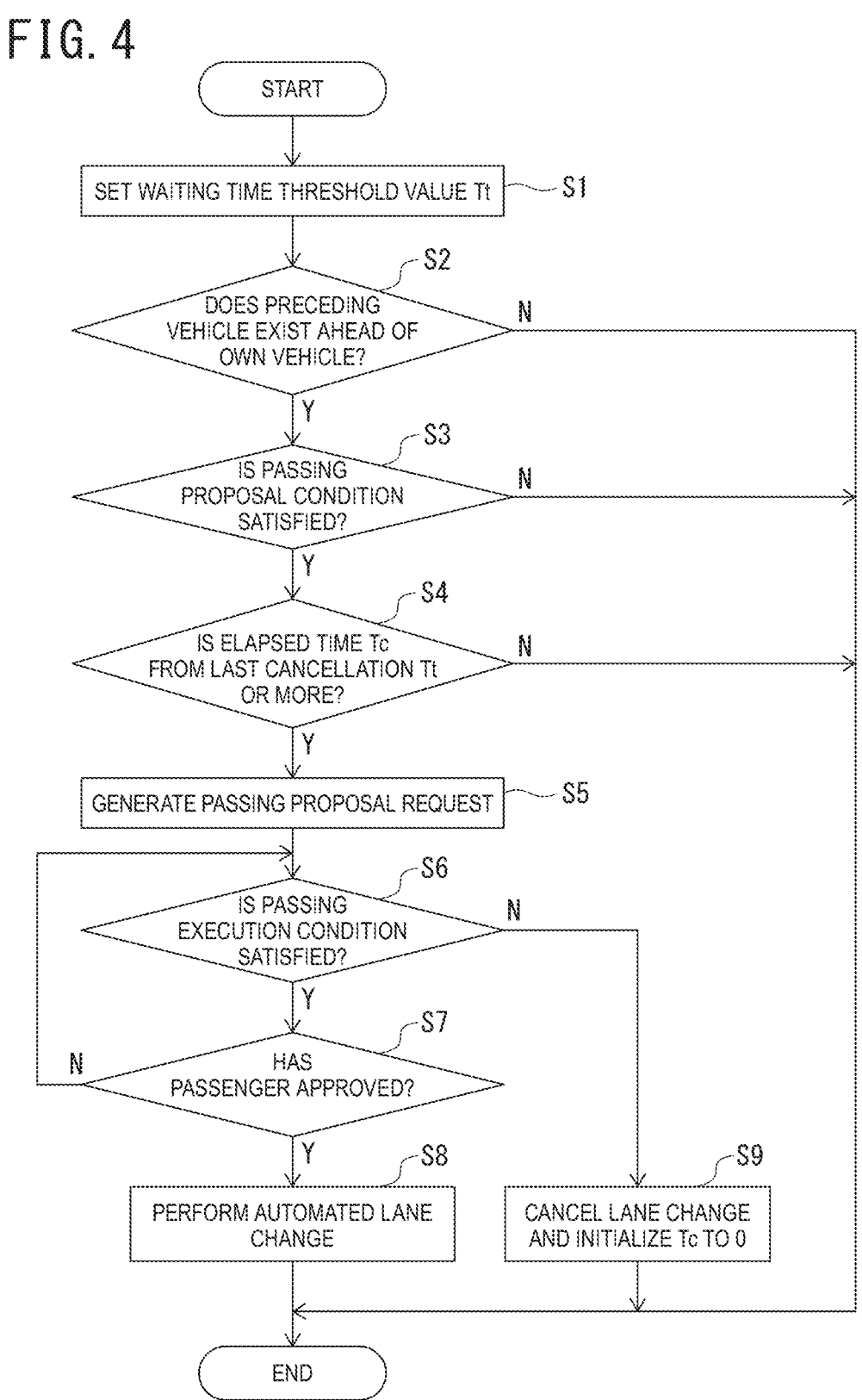
FIG. 4 is a flowchart of an example of processing of assisting a lane change in which an own vehicle 1 moves to an adjacent lane when the own vehicle 1 passes a preceding vehicle in the passing assistance control.

FIG. 4 is a flowchart of an example of processing of assisting a lane change in which the own vehicle 1 moves to an adjacent lane when the own vehicle 1 passes a preceding vehicle in the passing assistance control.

In step S1, the lane change setting management unit 30 sets a threshold speed Vt in response to an operation of an input device 18 or an in-vehicle device 14 performed by the passenger. The lane change setting management unit 30 sets a waiting time threshold value Tt according to the setting of the threshold speed Vt.

In step S2, the lane change request determination unit 33 determines whether or not a preceding vehicle exists ahead of the own vehicle 1. When a preceding vehicle exists (step S2: Y), the process proceeds to step S3. When no preceding vehicle exists (step S2: N), the process terminates.

In step S3, the lane change request determination unit 33 determines whether or not the passing proposal condition is satisfied. When the passing proposal condition is satisfied (step S3: Y), the process proceeds to step S4. When the passing proposal condition is not satisfied (step S3: N), the process terminates.

In step S4, the lane change request determination unit 33 determines whether or not elapsed time Tc since the lane change state management unit 35 canceled a passing proposal last time is greater than or equal to the waiting time threshold value Tt. When the elapsed time Tc is greater than or equal to the waiting time threshold value Tt (step S4: Y), the process proceeds to step S5. When the elapsed time Tc is not greater than or equal to the waiting time threshold value Tt (step S4: N), the process terminates.

In step S5, the lane change request determination unit 33 outputs a passing proposal request to the lane change state management unit 35.

In step S6, the lane change possibility determination unit 34 determines whether or not the passing execution condition is satisfied. When the passing execution condition is satisfied (step S6: Y), the process proceeds to step S7. When the passing execution condition is not satisfied (step S6: N), the process proceeds to step S9.

In step S7, the lane change state management unit 35 determines whether or not the passenger has approved a passing proposal. When the passenger has approved the passing proposal (step S7: Y), the process proceeds to step S8. When the passenger has not approved the passing proposal (step S7: N), the process returns to step S6.

In step S8, the lane change state management unit 35 performs the automated lane change to cause the own vehicle 1 to move to the destination lane. Subsequently, the process terminates.

In step S9, the lane change state management unit 35 cancels the automated lane change. That is, the lane change state management unit 35 cancels the passing proposal. The lane change request determination unit 33 resets a value of the elapsed time Tc to 0 and starts measurement of the elapsed time Tc since the lane change state management unit 35 canceled the passing proposal.

Figure 5:
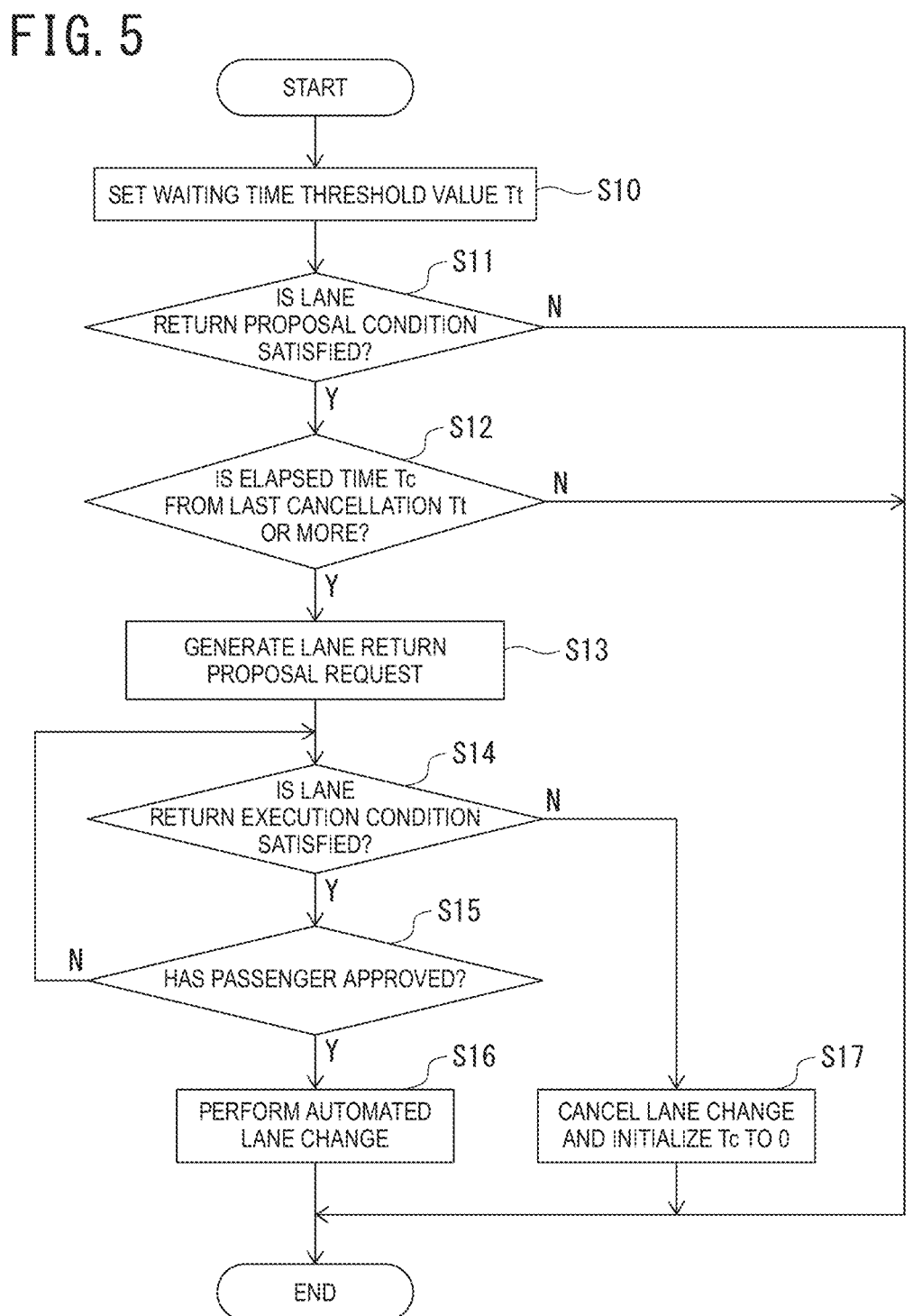
FIG. 5 is a flowchart of an example of processing of assisting a lane change in which the own vehicle 1 returns to an original lane after the own vehicle 1 has passed a preceding vehicle in the passing assistance control.

FIG. 5 is a flowchart of an example of processing of assisting a lane change in which the own vehicle 1 returns to an original lane after the own vehicle 1 has passed a preceding vehicle in the passing assistance control.

In step S10, the lane change setting management unit 30 sets the threshold speed Vt in response to an operation of an input device 18 or an in-vehicle device 14 performed by the passenger. The lane change setting management unit 30 sets the waiting time threshold value Tt according to the setting of the threshold speed Vt.

In step S11, the lane change request determination unit 33 determines whether or not the lane return proposal condition is satisfied. When the lane return proposal condition is satisfied (step S11: Y), the process proceeds to step S12. When the lane return proposal condition is not satisfied (step S11: N), the process terminates.

In step S12, the lane change request determination unit 33 determines whether or not elapsed time Tc since the lane change state management unit 35 canceled a lane return proposal last time is greater than or equal to the waiting time threshold value Tt. When the elapsed time Tc is greater than or equal to the waiting time threshold value Tt (step S12: Y), the process proceeds to step S13. When the elapsed time Tc is not greater than or equal to the waiting time threshold value Tt (step S12: N), the process terminates.

In step S13, the lane change request determination unit 33 outputs a lane return proposal request to the lane change state management unit 35.

In step S14, the lane change possibility determination unit 34 determines whether or not the lane return execution condition is satisfied. When the lane return execution condition is satisfied (step S14: Y), the process proceeds to step S14. When the lane return execution condition is not satisfied (step S14: N), the process proceeds to step S17.

In step S15, the lane change state management unit 35 determines whether or not the passenger has approved a lane return proposal. When the passenger has approved the lane return proposal (step S15: Y), the process proceeds to step S16. When the passenger has not approved the lane return proposal (step S15: N), the process returns to step S14.

In step S16, the lane change state management unit 35 performs the automated lane change to cause the own vehicle 1 to return to the original lane before the passing of the preceding vehicle. Subsequently, the process terminates.

In step S17, the lane change state management unit 35 cancels the automated lane change. That is, the lane change state management unit 35 cancels the lane return proposal. The lane change request determination unit 33 resets the value of the elapsed time Tc to 0 and starts measurement of the elapsed time Tc since the lane change state management unit 35 canceled the lane return proposal.

(Variation)

Although in the above-described embodiment, the controller 20 presents a proposal of a lane change under the autonomous travel control to the passenger as a passing proposal or a lane return proposal, proposal of a lane change in the present invention is not limited to proposal of a lane change under the autonomous travel control. For example, the controller 20 may propose passing a preceding vehicle by manual driving (manual operation) performed by a driver as a passing proposal or a lane return proposal.

Advantageous Effects of Embodiment (1) A controller 20 makes a proposal of a lane change to a passenger when an index value based on relative speed of a preceding vehicle with respect to the own vehicle 1 is less than a threshold value, and cancels the proposal of the lane change when a lane change execution condition depending on a travel environment of the own vehicle 1 is not satisfied. The controller 20 performs processing including: accepting setting of the threshold value; and not presenting a lane change proposal after the proposal of the lane change is canceled depending on the travel environment until a set time elapses from a time point when the proposal of the lane change is canceled, even when the index value is less than the threshold value. The set time is set to a longer time when the threshold value is high than when the threshold value is low.

Since when the set time, which is a period from a time point when a proposal of a lane change is canceled until a time point when a lane change becomes able to be proposed again, is long, change in the travel environment that occurs by the time when the set time elapses is more likely to become large than when the set time is short, there are some cases where a condition for proposing a lane change after the set time has elapsed becomes less likely to be established and a lane change becomes difficult to re-present. According to the present invention, in the case of a passenger who prefers lane change, it is possible to increase opportunities to be able to present a lane change by setting the set time short and thereby suppressing change in the travel environment. On the contrary, in the case of a passenger who does not prefer lane change very much, it is possible to decrease opportunities to be able to present a lane change by setting the set time long and thereby making change in the travel environment more likely to become large until the set time elapses. Because of this configuration, it is possible to prevent a proposal of a lane change from becoming troublesome for a passenger who does not prefer lane change very much.

In addition, until the set time elapses from a time point when a proposal of a lane change is canceled, another lane change is not proposed despite a condition for proposing a lane change being established. Therefore, it is considered that a passenger who prefers lane change feels troublesome to wait for a proposal of a lane change when the passenger feels the set time to be too long and attempts to make a lane change without waiting for a proposal of a lane change. For example, it is considered that the passenger attempts to make a lane change to pass a preceding vehicle without waiting for a passing proposal.

In such a case, there is a risk that the passenger starts the above-described lane change assistance control by operating the turn signal lever without the passing proposal condition being established. For example, when the lane change assistance control is started while the passing proposal condition is not established for some reason, such as distance d between another vehicle in the destination lane and the own vehicle 1 being too short and lane change to the destination lane side being unable to be performed, the automated lane change is canceled by the controller 20 since the lane change start condition is not established.

As described above, when the set time is excessively long for a passenger who prefers lane change, a useless operation to start the lane change assistance control is performed by the passenger or useless turning-on of a turn signal forces drivers of other vehicles around the own vehicle 1 to pay useless attention. According to the present invention, by setting an appropriate set time depending on whether or not a passenger prefers lane change, efficiency of driving operation of the own vehicle 1 can be improved.

(2) The controller 20 may detect distance between another vehicle in a lane, the lane being a lane change destination, and the own vehicle 1 as the travel environment. Because of this configuration, whether or not a lane change can be made can be determined according to the distance between another vehicle in a lane that is a lane change destination and the own vehicle 1.

(3) The controller 20 may accept, as input to set the threshold value performed by the passenger, input to select one of a first control mode in which a lane change is proposed when the index value is less than a first threshold value and a second control mode in which a lane change is proposed when the index value is less than a second threshold value, the second threshold value being smaller than the first threshold value. Because of this configuration, time from when a proposal of a lane change is canceled until a lane change is proposed again can be set depending on which control mode of the first control mode and the second control mode, which have different proposal frequencies of a lane change, the passenger selects.

(4) The controller 20 may perform autonomous speed control to maintain inter-vehicle distance between the own vehicle 1 and the preceding vehicle at a predetermined distance, the predetermined distance having been set in advance. The controller 20 may set the predetermined distance and the threshold value in an interlocking manner by accepting input to select one of the first control mode and the second control mode. Since because of this configuration, a set value of the inter-vehicle distance and proposal timing of a lane change in the autonomous speed control can be set by a single operation according to a setting of a drive mode that represents driving characteristics of the own vehicle 1, efficiency of operation performed by the passenger can be improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Own vehicle
10 Driving assistance device
11 Sensor
12 Positioning device
13 Map DB
14 In-vehicle device
15 Navigation system
16 Display device
17 Sound output device
18 Input device
19 Vehicle behavior control device
20 Controller
21 Processor
22 Storage device
The invention claimed is:

1. A driving assistance method for causing a controller to perform processing of making a proposal of a lane change to a passenger when an index value based on relative speed of a preceding vehicle with respect to an own vehicle is less than a threshold value and canceling the proposal of the lane change when a lane change execution condition depending on a travel environment of the own vehicle is not satisfied, wherein the controller performs processing including:
   accepting setting of the threshold value; and not presenting a lane change proposal after the proposal of the lane change is canceled depending on the travel environment until a set time elapses from a time point when the proposal of the lane change is canceled, even when the index value is less than the threshold value, and the set time is set to a longer time when the threshold value is high than when the threshold value is low.

2. The driving assistance method according to claim 1, wherein the controller detects distance between another vehicle in a lane, the lane being a lane change destination, and the own vehicle as the travel environment.

3. The driving assistance method according to claim 1, wherein the controller accepts, as input to set the threshold value performed by the passenger, input to select one of a first control mode in which a lane change is proposed when the index value is less than a first threshold value and a second control mode in which a lane change is proposed when the index value is less than a second threshold value, the second threshold value being smaller than the first threshold value.

4. The driving assistance method according to claim 3, wherein the controller:
   performs autonomous speed control to maintain inter-vehicle distance between the own vehicle and the preceding vehicle at a predetermined distance, the predetermined distance having been set in advance; and
   sets the predetermined distance and the threshold value in an interlocking manner by accepting input to select one of the first control mode and the second control mode.

5. A driving assistance device comprising a controller configured to make a proposal of a lane change to a passenger when an index value based on relative speed of a preceding vehicle with respect to an own vehicle is less than a threshold value and cancel the proposal of the lane change when a lane change execution condition depending on a travel environment of the own vehicle is not satisfied, wherein the controller performs processing including:
   accepting setting of the threshold value; and
   not presenting a lane change proposal after the proposal of the lane change is canceled depending on the travel environment until a set time elapses from a time point when the proposal of the lane change is canceled, even when the index value is less than the threshold value, and
   the set time is set to a longer time when the threshold value is high than when the threshold value is low.

* * * * *